United States Patent
Atsuta et al.

(10) Patent No.: US 8,922,522 B2
(45) Date of Patent: Dec. 30, 2014

(54) DISPLAY DEVICE EQUIPPED WITH TOUCH PANEL

(75) Inventors: Toshiaki Atsuta, Yokoshibahikari (JP); Koji Nagata, Hachioji (JP); Koji Doi, Chiba (JP)

(73) Assignees: Japan Display Inc., Tokyo (JP); Panasonic Liquid Crystal Display Co., Ltd., Hyogo (JP)

( * ) Notice: Subject to any disclaimer, the term of this patent is extended or adjusted under 35 U.S.C. 154(b) by 169 days.

(21) Appl. No.: 13/239,845

(22) Filed: Sep. 22, 2011

(65) Prior Publication Data

US 2012/0081332 A1    Apr. 5, 2012

(30) Foreign Application Priority Data

Sep. 30, 2010   (JP) ................................. 2010-221384

(51) Int. Cl.
*G06F 3/044*        (2006.01)
*G06F 3/041*        (2006.01)

(52) U.S. Cl.
CPC .............. *G06F 3/044* (2013.01); *G06F 3/0418* (2013.01)
USPC ............. 345/174; 345/87; 345/173; 345/175; 345/176; 345/204; 349/12; 349/106; 359/582

(58) Field of Classification Search
USPC ................. 345/173–176, 51, 87–93
See application file for complete search history.

(56) References Cited

U.S. PATENT DOCUMENTS

| | | | |
|---|---|---|---|
| 6,246,393 B1* | 6/2001 | Watanabe et al. ............. | 345/173 |
| 7,030,860 B1 | 4/2006 | Hsu et al. | |
| 2006/0097991 A1 | 5/2006 | Hotelling et al. | |
| 2008/0036473 A1 | 2/2008 | Jansson | |
| 2008/0165158 A1* | 7/2008 | Hotelling et al. ............. | 345/174 |
| 2009/0213090 A1* | 8/2009 | Mamba et al. ................ | 345/174 |
| 2009/0256821 A1* | 10/2009 | Mamba et al. ................ | 345/174 |
| 2010/0020032 A1* | 1/2010 | Mamba et al. ................ | 345/173 |
| 2010/0026664 A1* | 2/2010 | Geaghan ....................... | 345/174 |
| 2010/0066693 A1 | 3/2010 | Sato et al. | |

(Continued)

FOREIGN PATENT DOCUMENTS

| | | |
|---|---|---|
| EP | 2 026 180 | 2/2009 |
| EP | 2 149 838 | 2/2010 |

(Continued)

OTHER PUBLICATIONS

Office Action in TW Patent Appln. 100135068, dated Mar. 21, 2014, [partial English language translation, 5 pgs.].

*Primary Examiner* — Grant Sitta
(74) *Attorney, Agent, or Firm* — Antonelli, Terry, Stout & Kraus, LLP.

(57) ABSTRACT

Provided is a display device equipped with a touch panel, including a front panel arranged above a capacitive touch panel at a predetermined distance away therefrom, in which the touch panel includes a plurality of X electrodes and a plurality of Y electrodes, and the X electrodes are sequentially applied with pulse signals and the Y electrodes receive the pulse signals. When an arbitrary point on the front panel is touched, the touch panel computes a touched point on the touch panel by using both the received pulse signals obtained from the Y electrodes in a case where the front panel is not deformed and the received pulse signals obtained from the Y electrodes in a case where the front panel is deformed. With this, an erroneous operation in which a measurement value is lowered to finally disappear is prevented.

12 Claims, 15 Drawing Sheets

(56) References Cited

U.S. PATENT DOCUMENTS

2010/0134440 A1* 6/2010 Hayakawa et al. ............ 345/174
2010/0188346 A1* 7/2010 Yamauchi et al. ............ 345/173
2010/0271330 A1* 10/2010 Philipp ........................ 345/174
2011/0279409 A1* 11/2011 Salaverry et al. ............. 345/174
2012/0162094 A1* 6/2012 Kent et al. .................... 345/173

FOREIGN PATENT DOCUMENTS

| JP | 2003-511799 | 3/2003 |
| KR | 10-2009-0092695 | 9/2009 |
| KR | 10-2010-0059714 | 6/2010 |
| TW | 2010-32116 A1 | 9/2010 |
| TW | 1433014 B | 9/2010 |

* cited by examiner

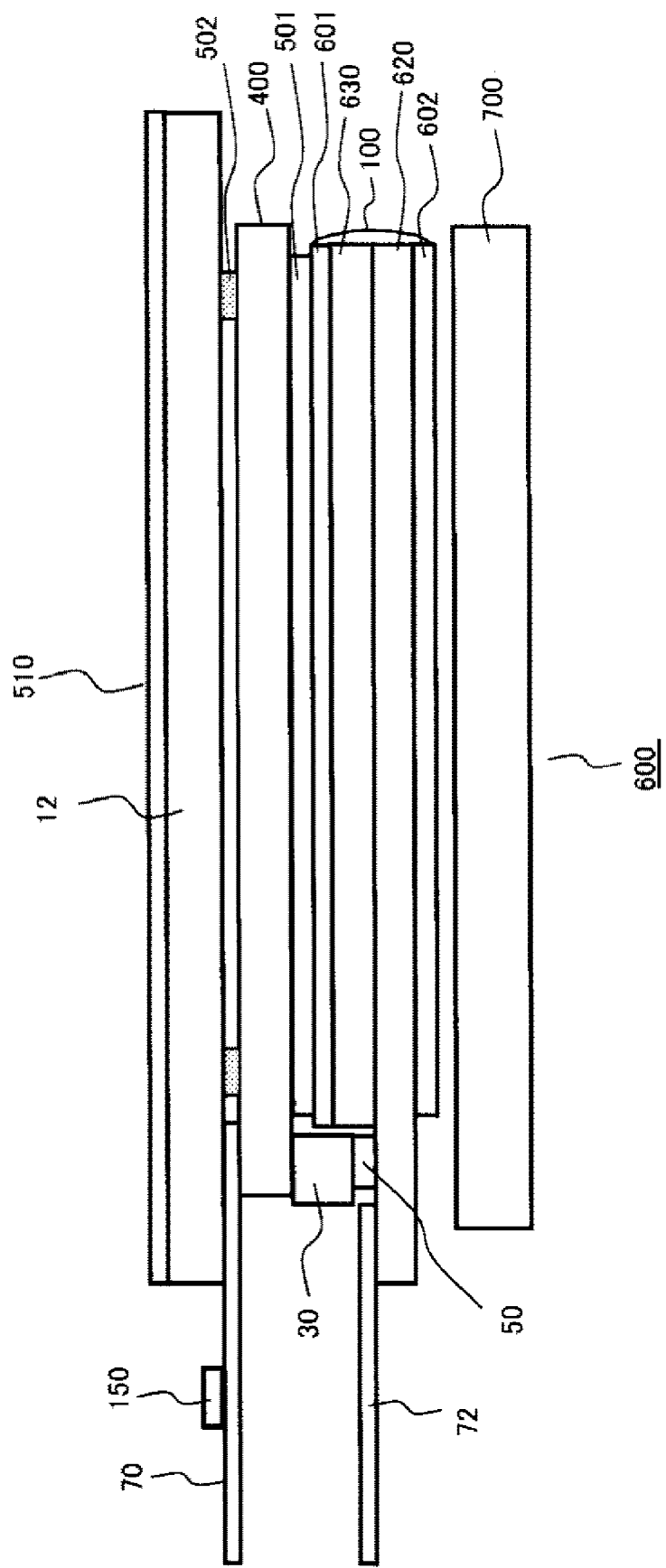

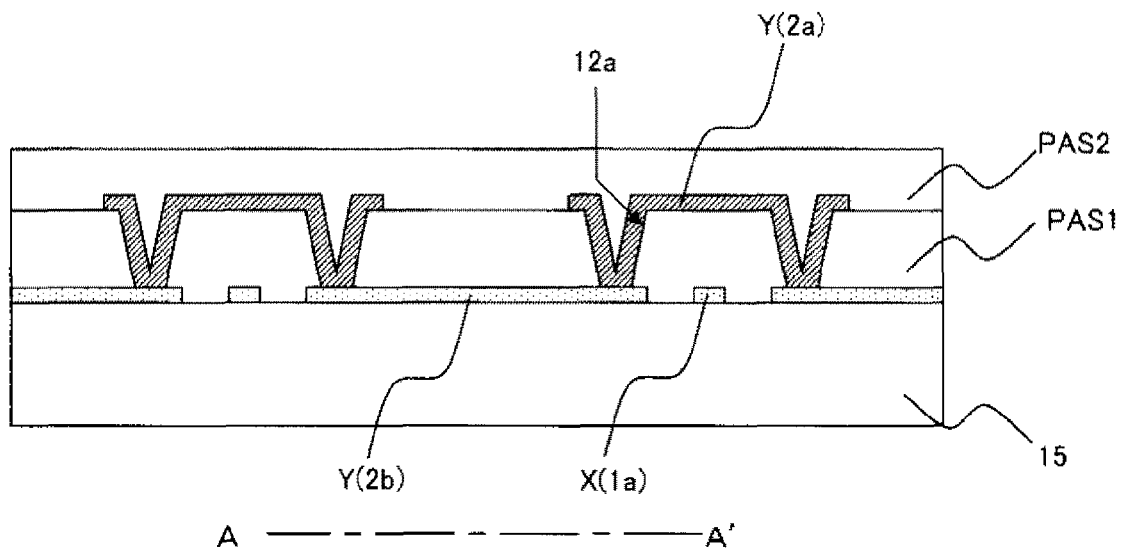
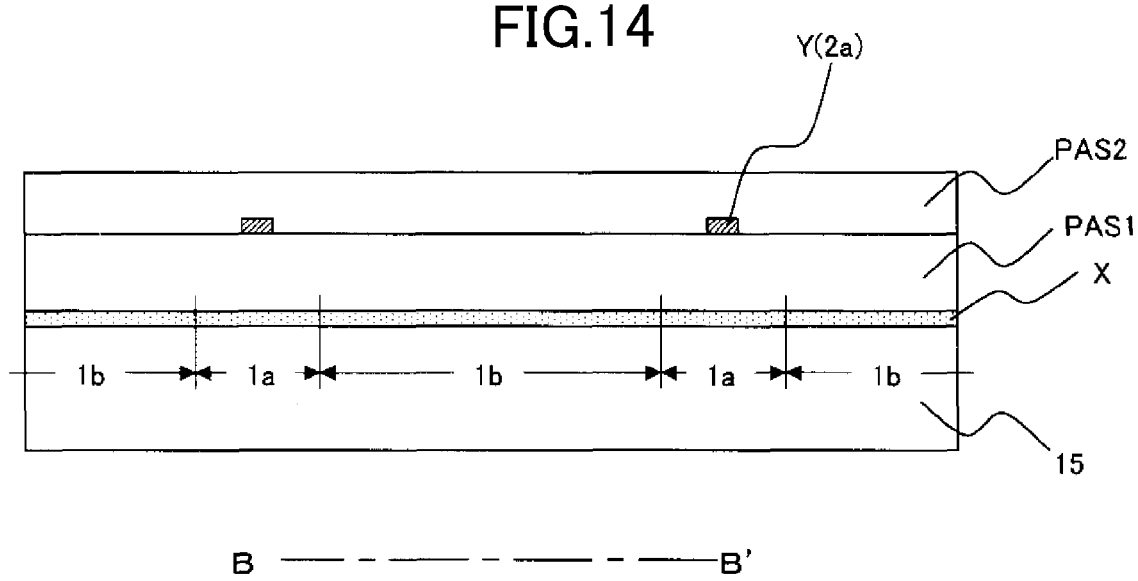

DISPLAY DEVICE EQUIPPED WITH TOUCH PANEL

CROSS-REFERENCE TO RELATED APPLICATION

The present application claims priority from Japanese application JP 2010-221384 filed on Sep. 30, 2010, the content of which is hereby incorporated by reference into this application.

BACKGROUND OF THE INVENTION

1. Field of the Invention

The present invention relates to a display device equipped with a touch panel, which includes a capacitive touch panel, in particular, to a technology effective for preventing an erroneous operation in which a measurement value is lowered to finally disappear occurring in a capacitive touch panel including an air layer provided between a front panel and the touch panel.

2. Description of the Related Art

A display device including a device (hereinafter, also referred to as "touch sensor" or "touch panel") for inputting information to a display screen by a touch operation (contact and press operation, hereinafter, simply referred to as "touch") by using a user's finger, a pen, or the like is used for mobile electronic devices such as a PDA and a mobile terminal, various consumer electric appliances, an automated teller machine, and the like. As this kind of touch panel, there are known resistance film type of detecting a change in resistance value of a touched portion, capacitive type of detecting a change in capacitance thereof, optical sensor type of detecting a change in amount of light, and the like.

An exemplary capacitive touch panel is disclosed in Japanese Patent Application Publication No. 2003-511799. In the capacitive touch panel disclosed therein, a vertical detection electrode (X electrode) and a horizontal detection electrode (Y electrode) are arranged in vertical and horizontal two-dimensional matrix, and a capacitance of each electrode is detected by an input processing part. When a conductor such as a finger touches a surface of the touch panel, the capacitance of each electrode increases. Thus, the input processing part detects the increase to calculate input coordinates based on a signal of a capacitance change detected by each electrode.

SUMMARY OF THE INVENTION

Conventionally, a capacitive touch panel generally has a structure in which a front panel is bonded to an entire front surface of the capacitive touch panel with an adhesive. Since the front panel is exposed on an outermost surface of the touch panel, the front panel is sometimes damaged or gets dirty, and hence is required to be replaced.

With the conventional structure, however, it is inevitable to replace the entire touch panel for replacing the front panel. In this regard, there is a request of replacing only the front panel.

In order to respond to the request, a method of providing an air layer between the touch panel and the front panel without bonding the touch panel and the front panel to each other has been proposed. According to the structure, for the repair of capacitive touch panel products, the improvement of workability and a reduction in cost can be realized.

When the air layer is provided between the touch panel and the front panel, however, it is supposed that an object to be sensed (for example, a finger or a conductor) may deform the front panel under load. In this case, an erroneous operation in which a measurement value is lowered to finally disappear occurs with an increase in the amount of deformation under load.

The present invention has been made to solve the problem of the conventional technology described above, and therefore has an object to provide a technology which enables the prevention of an erroneous operation in which a measurement value is lowered to finally disappear in a display device equipped with a touch panel, which includes a front panel provided above a capacitive touch panel at a predetermined distance away therefrom.

The above-mentioned and other objects and novel characteristics of the present invention become apparent from the description of this specification and the accompanying drawings.

Among aspects of the present invention disclosed in this application, the summary of the representative one is briefly described as follows.

In a display device equipped with a touch panel, which includes a capacitive touch panel provided on a display panel, a front panel provided above the capacitive touch panel, and an air layer provided between the touch panel and the front panel, when an object to be sensed (for example, a finger or a conductor) causes a deformation of the front panel under load, a phenomenon in which a measurement value is lowered to finally disappear occurs with an increase in the amount of deformation under load. The above-mentioned phenomenon is described as follows.

In the capacitive touch panel which detects a change in electrostatic capacitance at an intersection of an X electrode and a Y electrode, the object to be sensed (finger or conductor) acts as an electrostatic shield for blocking lines of electric force between the intersections of the X electrodes and the Y electrodes so as to detect a change in electrostatic capacitance, that is, a reduction in electrostatic capacitance at the intersection of the X electrode and the Y electrode.

On the other hand, if a larger amount of the front panel generally made of a material having a larger relative permittivity than that of air moves into a path of the lines of electric force at the intersection of the X electrode and the Y electrode due to the deformation under load described above, the electrostatic capacitance at the intersection of the X electrode and the Y electrode is increased to act so as to erase the measurement value of the object to be sensed (finger or conductor).

In the present invention, for detecting the proximity or contact of the object to be sensed (finger or conductor) to/with the touch panel, a reference value is set for sequentially tracking a state in which there is no proximity or contact of the object to be sensed (finger or conductor) to/with the touch panel. Based on the reference value, two threshold values, that is, a first threshold value and a second threshold value, each for determining the proximity or contact of the object to be sensed (finger or conductor), are respectively provided on the side where the intensity of a received signal increases and on the side where the intensity of the received signal decreases. When the intensity of the received signal becomes equal to or higher than the first threshold value or becomes equal to or lower than the second threshold value, it is determined that "a touch event occurs".

As described above, in the present invention, even if the measurement value is greatly changed to the negative side as a result of the deformation of the front panel under load, which is caused by the object to be sensed (finger or conductor), the measurement value is treated as an effective signal. As a result, the above-mentioned erroneous operation in which the measurement value disappears can be prevented.

The effects obtained by the representative one of the aspects of the present invention disclosed in this application are briefly described as follows.

According to the present invention, in the display device equipped with the touch panel, which includes the capacitive touch panel and the air layer provided between the front panel and the touch panel, the erroneous operation in which the measurement value is lowered to finally disappear can be prevented.

BRIEF DESCRIPTION OF THE DRAWINGS

In the accompanying drawings:

FIG. 2 is a sectional view of a principal part, for illustrating the display device equipped with the touch panel according to the embodiment of the present invention;

FIG. 13 is a sectional view illustrating a sectional structure taken along the line A-A' of FIG. 12;

FIG. 14 is a sectional view illustrating a sectional structure taken along the line B-B' of FIG. 12;

DETAILED DESCRIPTION OF THE INVENTION

In the following, an embodiment of the present invention is described in detail with reference to the drawings.

Throughout the drawings illustrating the embodiment of the present invention, components that have the same function are denoted by the same reference symbol in order to avoid repetitive description. Further, the following embodiment is not intended to limit the interpretation of the scope of the claims of the present invention in any way.

Figure 1:
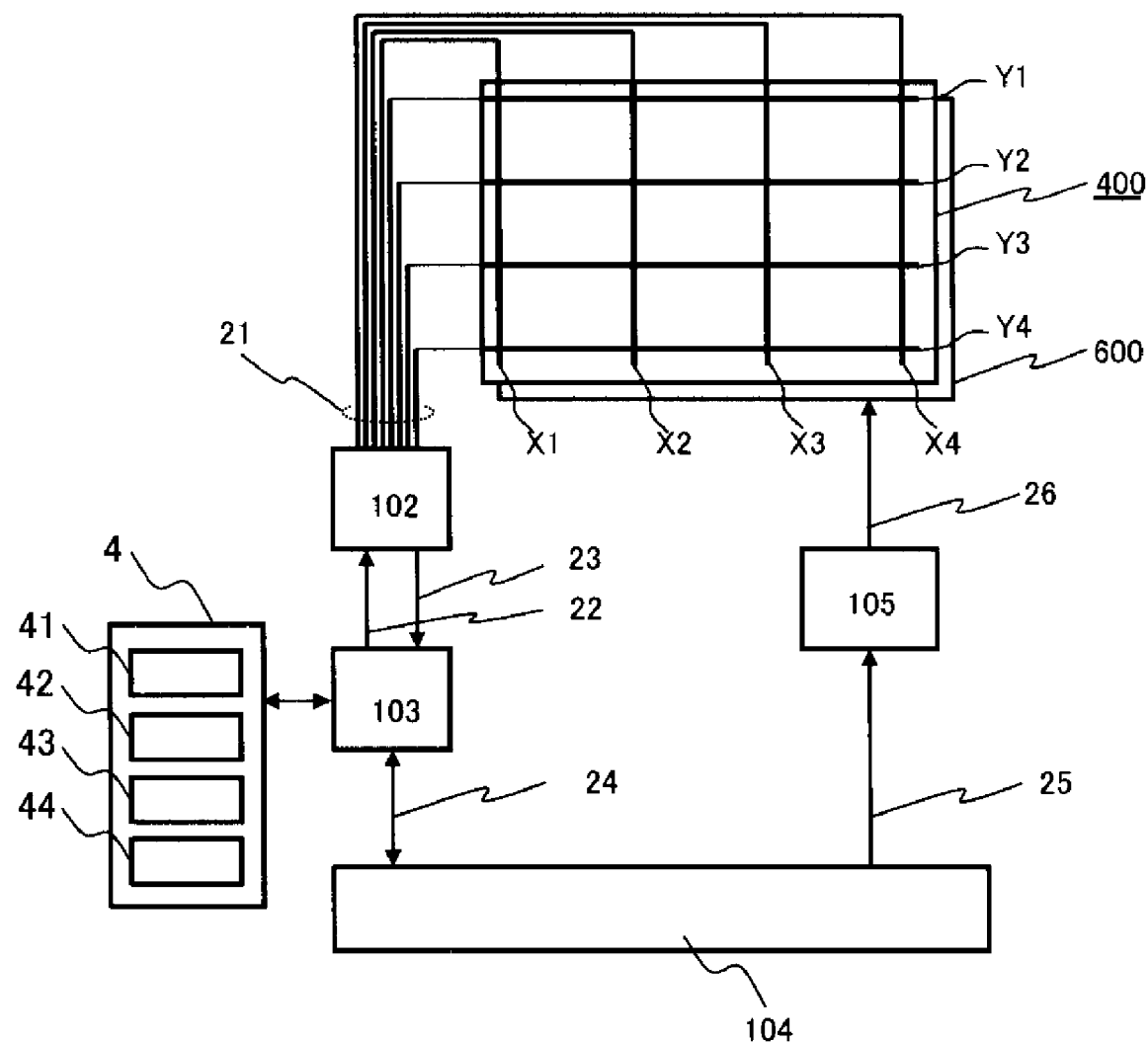
FIG. 1 is a diagram illustrating a schematic configuration of a display device equipped with a touch panel according to an embodiment of the present invention.

FIG. 1 is a diagram illustrating a schematic configuration of a display device equipped with a touch panel according to the embodiment of the present invention.

FIG. 1 illustrates a capacitive touch panel 400. The touch panel 400 includes X electrodes for capacitance detection and Y electrodes for capacitance detection. FIG. 1 illustrates as an exemplary case where four X electrodes (X1 to X4) and four Y electrodes (Y1 to Y4) are provided. However, each of the numbers of the X electrodes and the Y electrodes is not limited to four.

The touch panel 400 is disposed on a front surface of a display device 600. Accordingly, when an image displayed on the display device 600 is viewed by a user, the displayed image needs to pass through the touch panel 400, and hence the touch panel 400 is desired to have a high transmittance.

The X electrodes and the Y electrodes of the touch panel 400 are connected to a capacitance detecting unit 102 by wirings 21. The capacitance detecting unit 102 is controlled by a detection control signal 22 output from a control unit 103 so as to sequentially apply pulses by using the X electrodes X1 to X4 as transmitting electrodes (drive electrodes) and the Y electrodes Y1 to Y4 as receiving electrodes. In this manner, the intensity of a received signal at each of intersections of the X electrodes X1 to X4 and the Y electrodes Y1 to Y4 is measured. The measurement value is output as a capacitance measurement value 23 to the control unit 103.

A storage unit 4 stores a reference value 41, a measurement value 42, and a signal value 43 for each of the intersections of the electrodes (X electrodes and Y electrodes) as working data required for the control unit 103 to perform touch-detection processing. The storage unit 4 also stores a touch-state management table 44.

Each of the reference value 41, the measurement value 42, and the signal value 43 is two-dimensional array data with the number of X electrodes as the number of lateral elements and the number of Y electrodes as the number of longitudinal elements. The reference value 41 is data of the measurement value 42 obtained in a state in which no touch event occurs. The signal value 43 is data calculated based on the measurement value 42 in the touch-detection processing. The touch-state management table 44 is a table for storing touch coordinates and the like as the results of detection of a touch event.

The control unit 103 obtains input coordinates from the capacitance measurement value 23 of each electrode by a computation. The control unit 103 then transfers the input coordinates to a system control unit 104 by using an I/F signal 24.

When the input coordinates are transferred from the touch panel 400 in response to a touch operation, the system control unit 104 generates a display image according to the touch operation and then transfers the generated display image to a display control circuit 105 as a display control signal 25.

The display control circuit 105 generates a display signal 26 according to the display image transferred as the display control signal 25 and then displays an image on the display device 600.

FIG. 2 is a sectional view of a principal part, for illustrating the display device equipped with the touch panel according to the embodiment of the present invention, which illustrates a multi-layered structure in which the touch panel and a front panel are laminated on a display panel.

As the display panel, any display panel can be used as long as the touch panel can be used therewith. Therefore, the display panel is not limited to a liquid crystal display panel, and a display panel using organic light-emitting diode elements or surface-conduction electron emitters or an organic EL display panel can also be used.

The display device 600 of this embodiment includes, as illustrated in FIG. 2, a liquid crystal display panel 100, the capacitive touch panel 400, which is placed on an observer side of the liquid crystal display panel 100, and a backlight 700, which is placed under the opposite side of the liquid crystal display panel 100 from the observer side. The liquid crystal display panel 100 may be, for example, an IPS liquid crystal display panel, a TN liquid crystal display panel, or a VA liquid crystal display panel.

The liquid crystal display panel 100 includes two substrates 620 and 630 bonded to each other, which are provided so as to be opposed to each other. A polarizer 601 is provided on an outer surface of the substrate 630, whereas a polarizer 602 is provided on an outer surface of the substrate 620.

The liquid crystal display panel 100 and the touch panel 400 are bonded to each other by an adhesive 501 made of a resin or made from an adhesive film. Further, a front panel (also referred to as "front-surface protective plate") 12 made of an acrylic resin is provided on an outer surface of the touch panel 400 via spacers 502 arranged in an peripheral portion of the front panel 12.

A flexible printed board 70 is connected to the touch panel 400. A drive circuit 150 is mounted on the flexible printed board 70. A signal output from the drive circuit 150 is fed to the touch panel 400 via the flexible printed board 70. The storage unit 4, the capacitance detecting unit 102, and the control unit 103, which are described above and illustrated in FIG. 1, are provided in the drive circuit 150 so as to control the detection of a position of input or the like.

In FIG. 2, a protective sheet 510 is provided on a front surface of the front panel 12 so as to prevent the front panel 12 from being scratched or damaged by a pen or the like. An electrode pattern of the touch panel 400 is described below.

In FIG. 2, a region of the substrate 620, on which a liquid crystal driving circuit 50 is mounted, projects from the other substrate 630 to form a single-plate shape. A problem of damaging the substrate 620 sometimes occurs in the region of the substrate 620, on which the liquid crystal driving circuit 50 is mounted. For preventing the problem, a spacer 30 is provided between the substrate 620 and the touch panel 400 so as to improve strength.

A liquid crystal display device includes the liquid crystal display panel 100, the liquid crystal driving circuit 50, a flexible printed board 72, and a backlight 700. On one side of the liquid crystal display panel 100, the liquid crystal driving circuit 50 is provided. Various signals are fed to the liquid crystal display panel 100 by the liquid crystal driving circuit 50. The flexible printed board 72 is electrically connected to the liquid crystal driving circuit 50 so as to feed a signal from the exterior thereto.

The liquid crystal display panel 100 includes the substrate 620, the substrate 630, the polarizers 601 and 602, and the flexible printed board 72. Although the illustration thereof is omitted, a thin-film transistor, a pixel electrode, and a counter electrode (common electrode) are formed on the substrate 620 (hereinafter, also referred to as "TFT substrate"). Color filters and the like are formed on the substrate 630 (hereinafter, also referred to as "filter substrate"). The substrates 620 and 630 are overlapped with a predetermined gap therebetween. The substrates 620 and 630 are bonded to each other by a frame-like sealing member (not shown) provided in the vicinity of a peripheral portion between the substrates 620 and 630. A liquid-crystal composition is injected and sealed inside the sealing member. Further, the polarizers 601 and 602 are respectively bonded to the outer surfaces of the substrates 630 and 620. Then, the flexible printed board 72 is connected to the TFT substrate 620.

This embodiment can be applied in the similar manner even to a so-called in-plane switching type liquid crystal display panel in which the counter electrode is provided on the TFT substrate 620 and to a so-called vertical electric field type liquid crystal display panel in which the counter electrode is provided on the filter substrate 630.

Figure 3A:
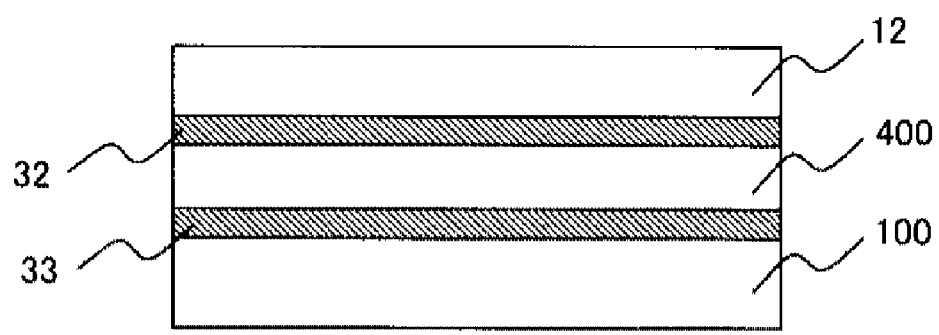
FIG. 3A is a conceptual diagram illustrating a multi-layered structure of a conventional display device equipped with a touch panel.
Figure 3B:
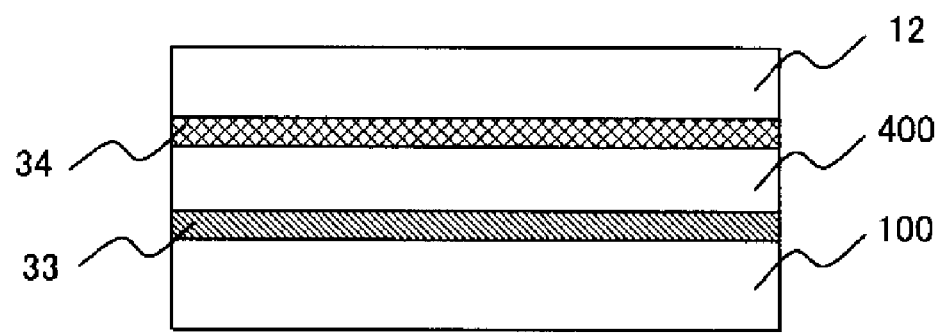
FIG. 3B is a conceptual diagram illustrating a multi-layered structure of the display device equipped with the touch panel according to the embodiment of the present invention.

FIGS. 3A and 3B are conceptual diagrams respectively illustrating multi-layered structures of a conventional display device equipped with a touch panel and the display device equipped with the touch panel according to the embodiment of the present invention.

FIG. 3A is a conceptual diagram for illustrating the multi-layered structure of the conventional display device equipped with the touch panel. The touch panel 400 is bonded onto the liquid crystal display panel 100 with an adhesive 33. Then, the front panel 12 is bonded onto the touch panel 400 with an adhesive 32.

FIG. 3B is a conceptual diagram for illustrating the multi-layered structure of the display device equipped with the touch panel according to this embodiment. The touch panel 400 is bonded onto the liquid crystal display panel 100 with the adhesive 33. In contrast to the conventional display device, an air layer 34 is provided without bonding the front panel 12 onto the touch panel 400.

Figure 4A:
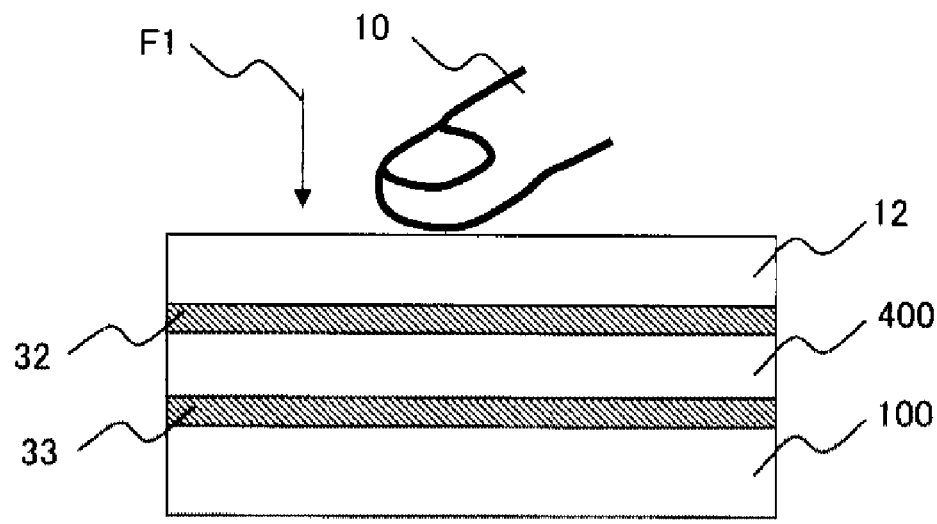
FIGS. 4A and 4B are conceptual diagrams respectively illustrating a structural deformation occurring, in the structure illustrated in FIG. 3A, when a finger is in contact with a front panel with a small load thereon and when the finger is in contact with the front panel with a large load thereon.
Figure 4B:
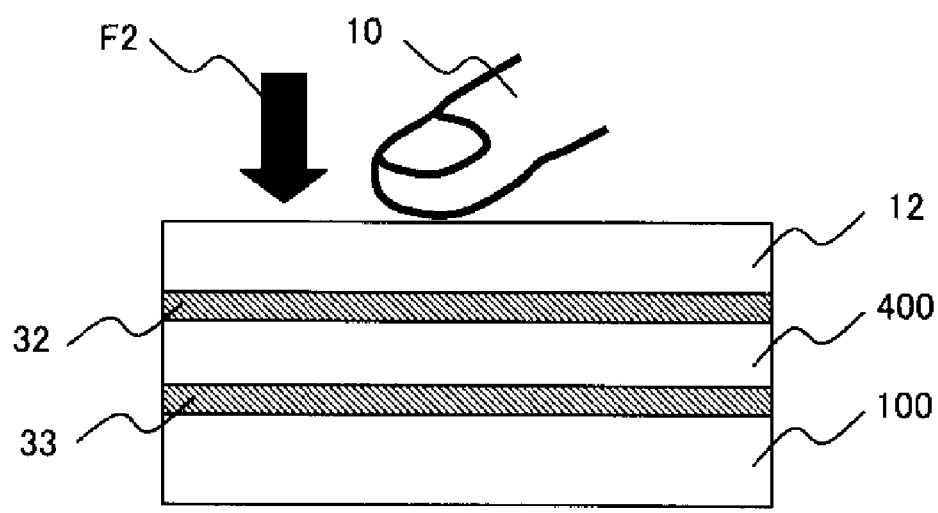

FIGS. 4A and 4B are conceptual diagrams illustrating a structural deformation occurring, in the structure illustrated in FIG. 3A, when a finger is in contact with the front panel 12 with a small load thereon and when the finger is in contact with the front panel 12 with a large load thereon, respectively.

FIG. 4A is a diagram illustrating a structural deformation occurring, in the structure illustrated in FIG. 3A, when a finger 10 is in contact with the front panel 12 with a small load (indicated by an arrow F1 of FIG. 4A). FIG. 4B is a diagram illustrating a structural deformation occurring, in the structure illustrated in FIG. 3A, when the finger 10 is in contact with the front panel 12 with a large load (indicated by an arrow F2 of FIG. 4B).

As can be seen from FIGS. 4A and 4B, in each of the case where the finger 10 is brought into contact with the front panel with the small load (indicated by the arrow F1 of FIG. 4A) and the case where the finger 10 is brought into contact with the front panel with the large load (indicated by the arrow F2 of FIG. 4B), the front panel 12 is not deformed in the conventional display device equipped with the touch panel because the liquid crystal display panel 100, the touch panel 400, and the front panel 12 are bonded to each other with the adhesives 32 and 33.

Figure 5A:
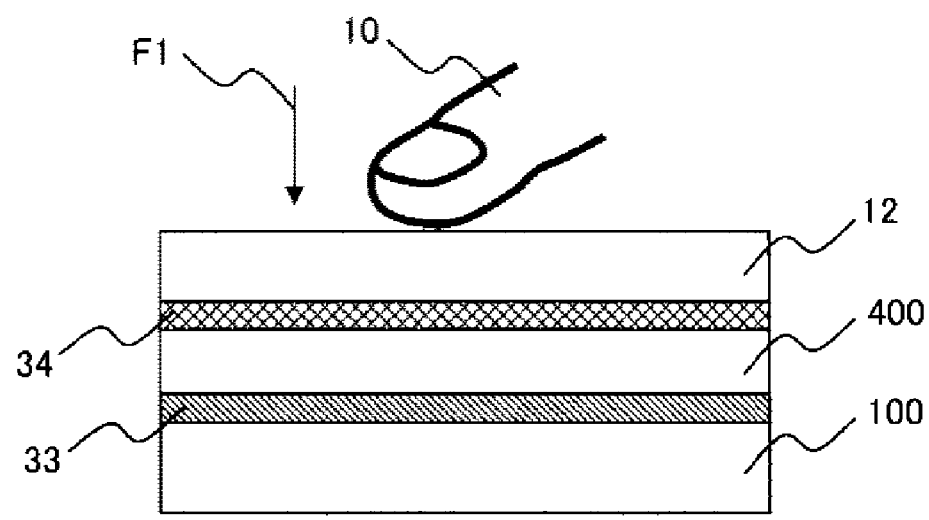
FIGS. 5A and 5B are conceptual diagrams respectively illustrating a structural deformation occurring, in the structure illustrated in FIG. 3B, when the finger is in contact with the front panel with a small load thereon and when the finger is in contact with the front panel with a large load thereon.
Figure 5B:
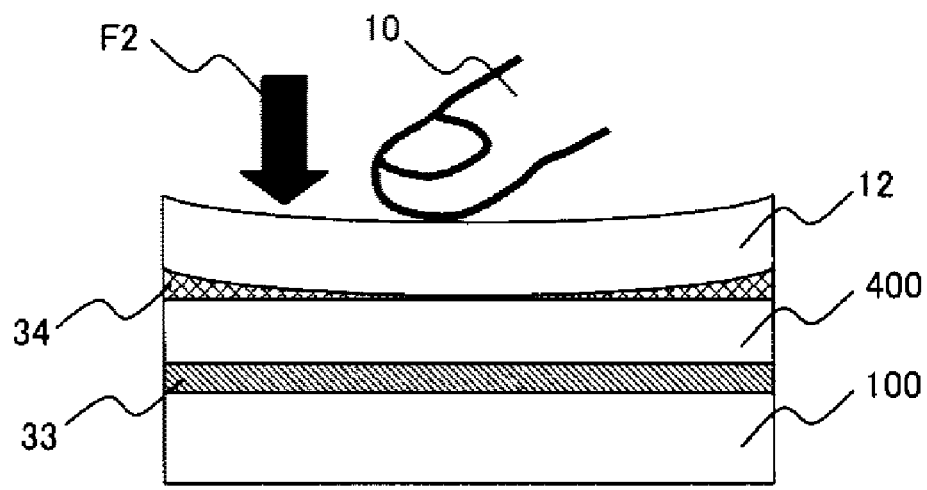

FIGS. 5A and 5B are conceptual diagrams illustrating a structural deformation occurring, in the structure illustrated in FIG. 3B, when the finger is in contact with the front panel 12 with a small load thereon and when the finger is in contact with the front panel 12 with a large load thereon, respectively.

FIG. 5A is a diagram illustrating a structural deformation occurring, in the structure illustrated in FIG. 3B, when the finger 10 is in contact with the front panel 12 with a small load (indicated by an arrow F1 of FIG. 5A). FIG. 5B is a diagram illustrating a structural deformation occurring, in the structure illustrated in FIG. 3B, when the finger 10 is in contact with the front panel 12 with a large load (indicated by an arrow F2 of FIG. 5B).

As can be seen from FIG. 5A, when the finger 10 is brought into contact with the front panel 12 with the small load thereon in the structure illustrated in FIG. 3B, the front panel 12 is not deformed. However, as illustrated in FIG. 5B, when the finger 10 is brought into contact with the front panel 12 with the large load thereon in the structure illustrated in FIG. 3B, the air layer 34 is compressed to deflect the front panel 12.

Figure 6A:
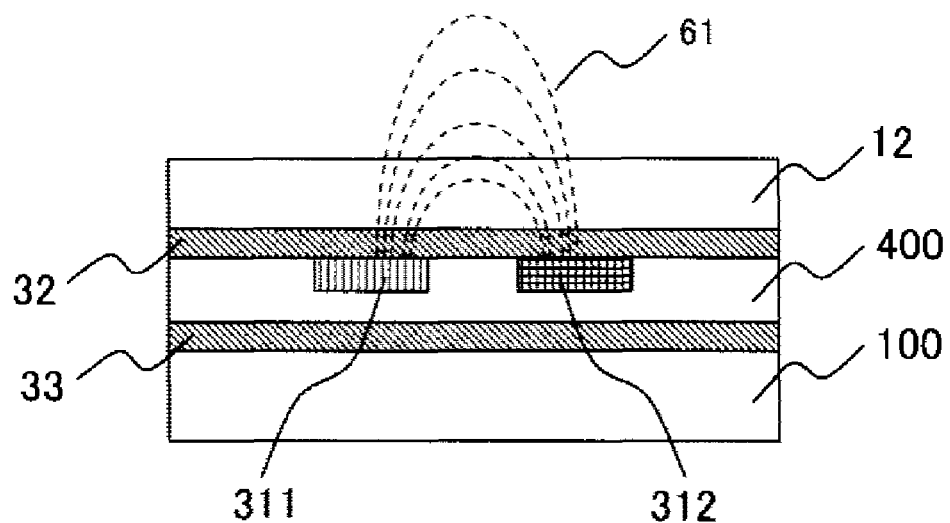
FIGS. 6A and 6B are conceptual diagram each illustrating a state of lines of electric force between an X electrode and a Y electrode in the structure illustrated in FIG. 3A.
Figure 6B:
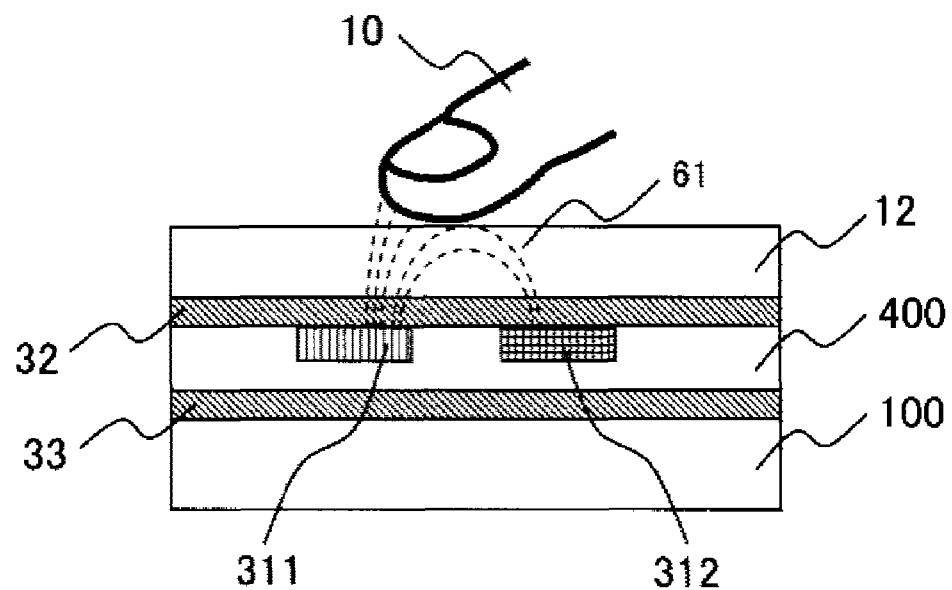

FIGS. 6A and 6B are conceptual diagrams, each illustrating a state of lines of electric force between the X electrode and the Y electrode in the structure illustrated in FIG. 3A.

FIG. 6A is a conceptual diagram illustrating a state of lines of electric force between an X electrode 311 and a Y electrode 312 which is obtained when the finger 10 is not in contact with the front panel 12 in the structure illustrated in FIG. 3A. FIG. 6B is a conceptual diagram illustrating a state of lines of electric force between the X electrode 311 and the Y electrode 312 which is obtained when the finger 10 is in contact with the front panel 12 in the structure illustrated in FIG. 3A.

As illustrated in FIG. 6B, a change in potential of a finger surface is small. Therefore, lines 61 of electric force are blocked by the finger surface. As a result, an electrostatic capacitance between the X electrode 311 and the Y electrode 312 is reduced. The touch panel 400 included in each of the conventional display device equipped with the touch panel and the display device equipped with the touch panel according to this embodiment uses a method of detecting a change in capacitance.

In FIGS. 6A and 6B and FIGS. 7A to 9 referred to below, the plurality of X electrodes are representatively illustrated as the X electrode 311 and the plurality of Y electrodes are representatively illustrated as the Y electrode 312.

Figure 7A:
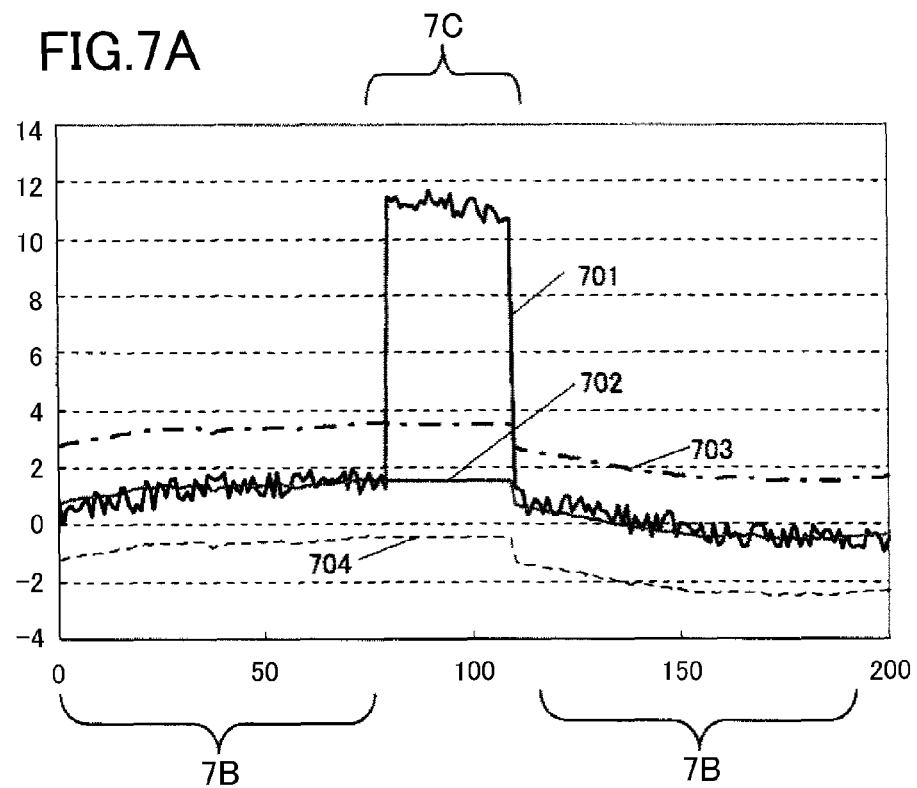
FIG. 7A is a graph showing a time-series change in measurement value obtained when the finger is not in contact with the front panel and when the finger is in contact with the front panel in the structure illustrated in FIG. 3A, and FIGS. 7B and 7C are conceptual diagrams illustrating states of lines of electric force obtained in the time periods respectively denoted by the symbols A and B in FIG. 7A.

FIG. 7A is a graph showing a time-series change in measurement value obtained when the finger 10 is not in contact with the front panel 12 and the finger 10 is in contact with the front panel 12 in the structure illustrated in FIG. 3A.

In the graph of FIG. 7A, the horizontal axis represents time, whereas the vertical axis represents signal intensity (digital value obtained by AD conversion of the measurement value of the received signal). FIG. 7A shows a measurement value 701 of the signal intensity for each of the intersections of the electrodes, a reference value 702 for continuously monitoring a state in which no contact is made, and criterion threshold values 703 and 704 set based on the reference value 702.

In the touch panel 400 of each of the conventional display device equipped with the touch panel and the display device equipped with the touch panel according to this embodiment, the signals (pulses) are sequentially applied from the X electrodes X1 to X4. From the measurement values 701 of the signals received by the Y electrodes Y1 to Y4, the reference value 702 is calculated so as to detect whether or not a touch event occurs. This processing is for preventing an erroneous operation even if the capacitance between the electrodes for each intersection of the X electrode and the Y electrode changes due to a change in temperature or humidity.

A method of calculating the reference value 702 is as follows. It is first determined whether the measurement value 701 of the intensity of the received signal for each intersection of the X electrode and the Y electrode is larger or smaller than the current reference value 702 for each scan. When the measurement value 701 of the intensity of the received signal for each intersection of the electrodes is larger than the current reference value 702, a value of a counter for increasing the reference value is incremented. When the value of the counter reaches a predetermined count value, the reference value 702 is updated to a value larger than the current reference value 702.

On the other hand, when the measurement value 702 of the intensity of the received signal for each intersection of the electrodes is smaller than the current reference value 702, a value of a counter for reducing the reference value is incremented. When the value of the counter reaches a predetermined count value, the reference value 702 is updated to a value smaller than the current reference value 702.

Figure 7B:
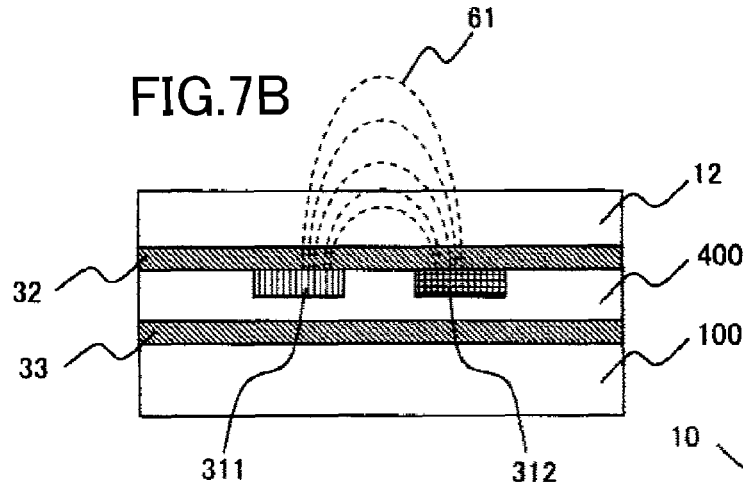
Figure 7C:
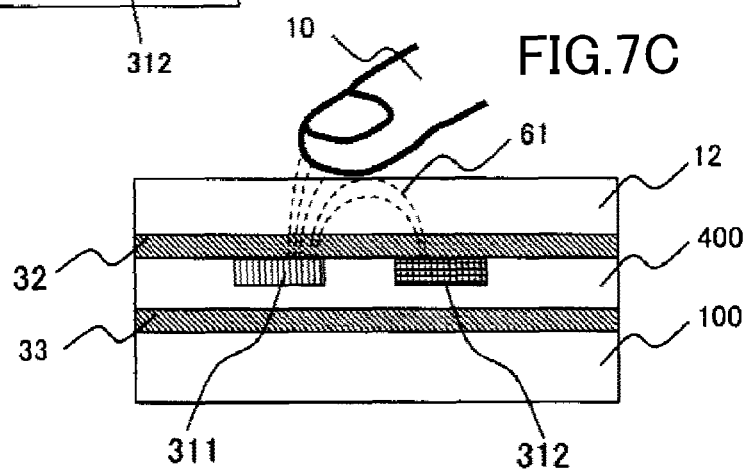

In the graph of FIG. 7A, a time period between time 0 and time 75 and a time period between time 110 and time 200 are a time period in which the finger 10 is not in contact with the front panel 12, as illustrated in FIG. 7B. The remaining time period (a time period between time 75 and time 110) is a time period in which the finger 10 is in contact with the front panel 12, as illustrated in FIG. 7C.

As shown in the graph of FIG. 7A, by the contact of the finger 10 with the front panel 12, the measurement value 701 suddenly changes (the polarity is set so that the measurement value shifts toward the positive side in this case). When the measurement value 701 exceeds the threshold value 703, it is determined that a contact is made, specifically, it is determined that effective data exists. In this time period, the reference value 702 is not updated.

When the finger 10 is released from the front panel 12 and hence the measurement value 701 becomes lower than the threshold value 703 again, it is determined that no contact is made, specifically, it is determined that no effective data exists. At this point, the update of the reference value 702 is restarted.

Figure 8A:
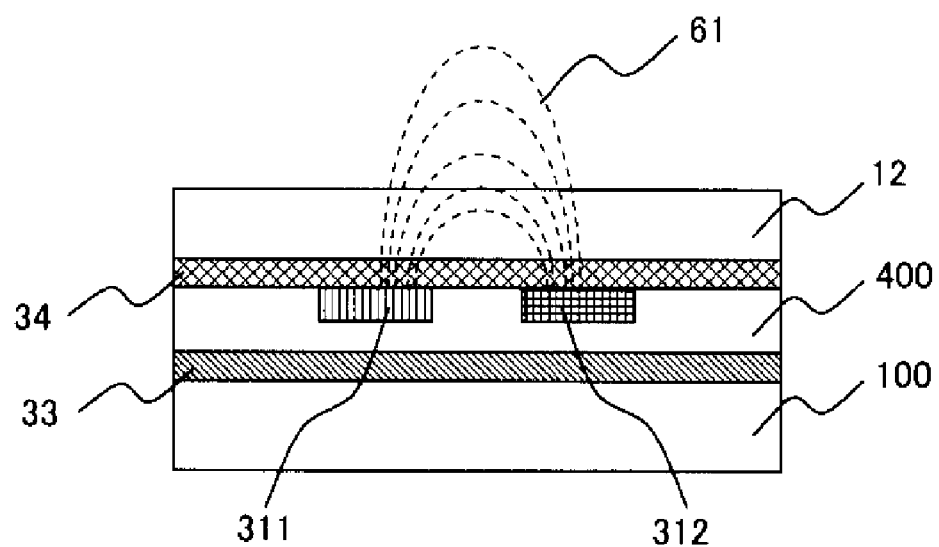
FIGS. 8A and 8B are conceptual diagrams each illustrating a state of the lines of electric force between the X electrode and the Y electrode in the structure illustrated in FIG. 3B.
Figure 8B:
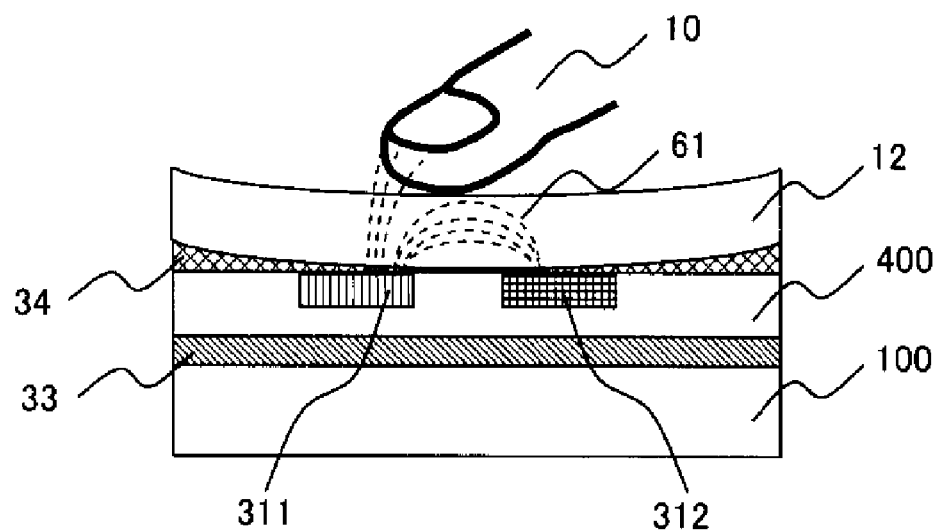

FIGS. 8A and 8B are conceptual diagrams, each illustrating a state of lines of electric force between the X electrode 311 and the Y electrode 312 in the structure illustrated in FIG. 3B.

FIG. 8A is a conceptual diagram illustrating a state of lines of electric force between the X electrode 311 and the Y electrode 312 which is obtained, in the structure illustrated in FIG. 3B, when the finger 10 is not in contact with the front panel 12. FIG. 8B is a conceptual diagram illustrating a state of lines of electric force between the X electrode 311 and the Y electrode 312 which is obtained, in the structure illustrated in FIG. 3B, when the finger 10 is in contact with the front panel 12 with a large load thereon.

As illustrated in FIGS. 8A and 8B, a change in potential of the finger surface is small. Therefore, the lines 61 of electric force are blocked by the finger surface. As a result, the electrostatic capacitance between the X electrode 311 and the Y electrode 312 is reduced.

On the other hand, when the finger 10 comes into contact with the front panel 12 with the large load thereon as illustrated in FIG. 8B, the front panel 12 comes closer to the X electrode 311 and the Y electrode 312. By the movement of the front panel 12 closer to the electrodes, a permittivity between the X electrode 311 and the Y electrode 312 increases to increase the capacitance between the X electrode 311 and the Y electrode 312. In this case, the effects of increasing the electrostatic capacitance by the proximity of the front panel to the electrodes surpass the blocking effects obtained by the finger 10. As a result, the polarity of the measurement value is reversed as compared to that described referring to FIGS. 6A and 6B.

Figure 9A:
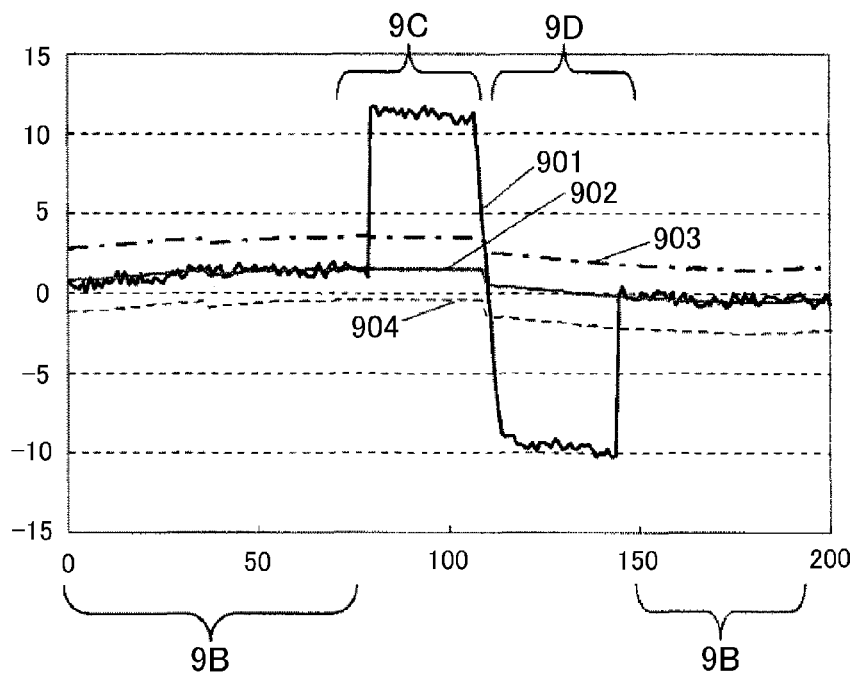
FIG. 9A is a graph showing a time-series change in measurement value obtained when the finger is not in contact with the front panel and when the finger is in contact with the front panel in the structure illustrated in FIG. 3B, and FIGS. 9B to 9D are conceptual diagrams each illustrating a state of the lines of electric force obtained in the time periods respectively denoted by the symbols B to D in FIG. 9A.

FIG. 9A is a graph showing a time-series change in measurement value obtained when the finger 10 is not in contact with the front panel 12 and the finger 10 is in contact with the front panel 12 in the structure illustrated in FIG. 3B.

In the graph of FIG. 9A, the horizontal axis represents time, whereas the vertical axis represents signal intensity (digital value obtained by AD conversion of the measurement value of the received signal). FIG. 9A shows a measurement value 901 of the signal intensity for each of the intersections of the electrodes, a reference value 902 for continuously monitoring a state in which no contact is made, and criterion threshold values 903 and 904 set based on the reference value 902.

Figure 9B:
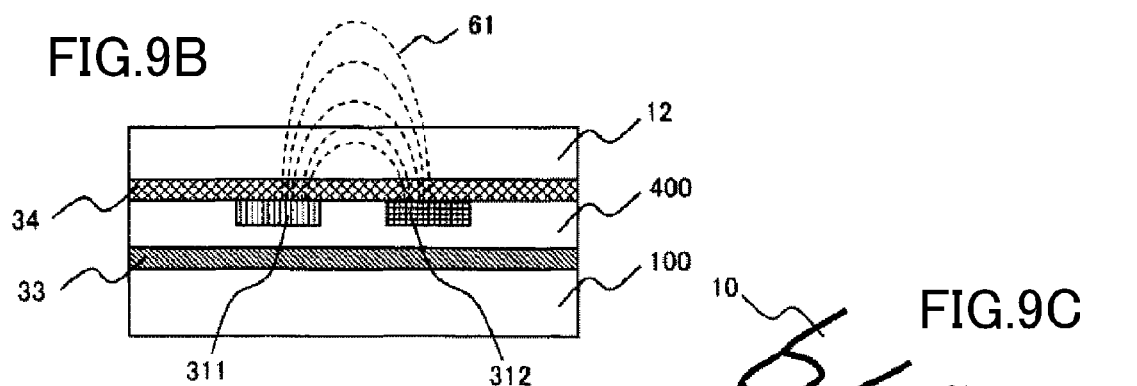

A time period between time 0 and time 75 and a time period between time 150 and time 200 are a time period in which the finger 10 is not in contact with the front panel 12 as illustrated in FIG. 9B. The remaining time period (a time period between time 75 and time 150) is a time period in which the finger 10 is in contact with the front panel 12 as illustrated in FIGS. 9C and 9D.

Figure 9C:
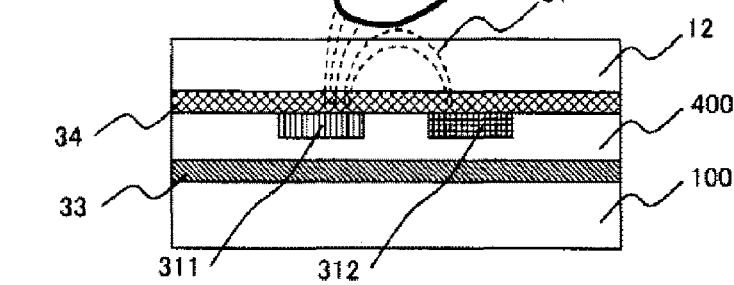
Figure 9D:
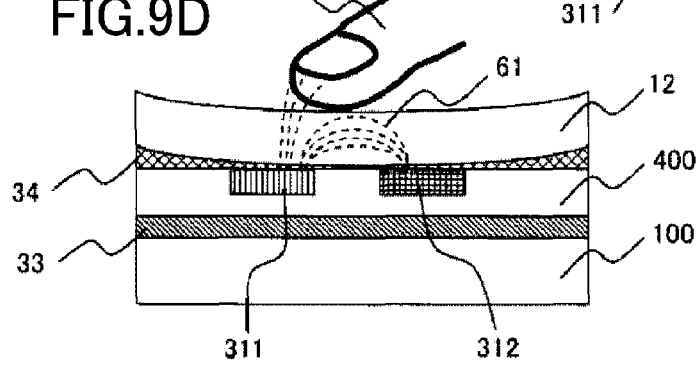

A time period between time 75 and time 110 is a time period in which the finger 10 is in contact with the front panel 12 with a small load thereon, as illustrated in FIG. 9C. A time period between time 110 and time 150 is a time period in which the finger 10 is in contact with the front panel 12 with a large load thereon, as illustrated FIG. 9D.

As described above referring to FIG. 5A, when the finger 10 comes into contact with the front panel 12 with the small load, the structure illustrated in FIG. 3B is not deformed. Therefore, in the time period between time 75 and time 110, the same signal as that generated in the time period between time 75 and time 110 shown in FIG. 7A is generated.

On the other hand, when the finger 10 comes into contact with the front panel 12 with the large load thereon, the front panel 12 is deformed as illustrated in FIG. 5B. As a result, the front panel 12 is deflected toward the touch panel. Then, by the phenomenon illustrated in FIG. 8B, the measurement value 901 is reduced to be finally shifted to the negative side.

In the signal processing for the touch panel 400 of the conventional display device equipped with the touch panel, the generation of the negative measurement value 901 is not taken into consideration. The above-mentioned behavior of the measurement value 901 appears as the disappearance of the measurement value 901. If the above-mentioned phenomenon occurs, the touch panel 400 is placed in a state in which there is no reaction from the touch panel 400 even though the user touches the touch panel 400 with the finger 10.

Figure 10A:
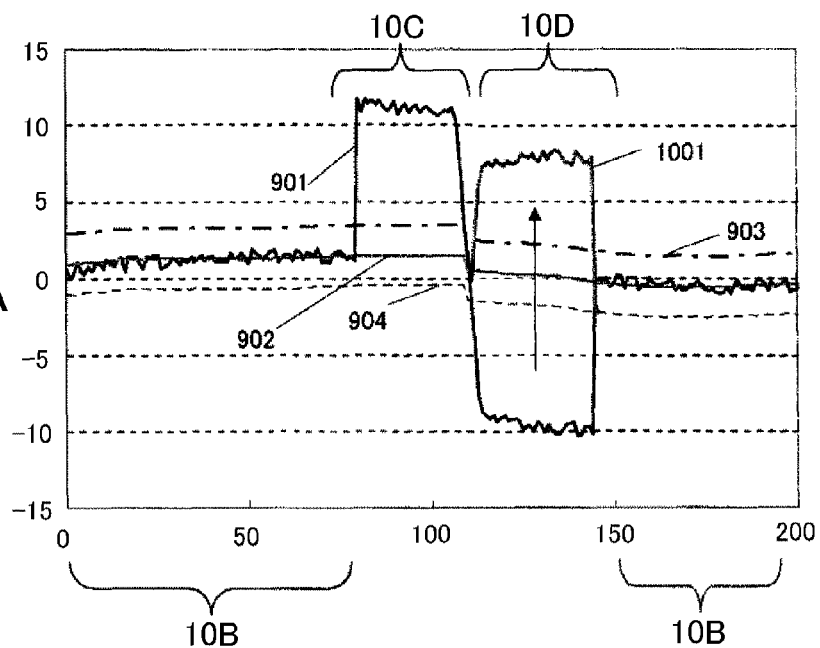
FIG. 10A is a graph for illustrating signal processing of the touch panel of the display device equipped with the touch panel according to the embodiment of the present invention.

FIG. 10A is a graph for illustrating the signal processing for the touch panel 400 according to this embodiment. FIG. 10A is a graph for illustrating the result of using the signal processing for the touch panel 400 according to this embodiment in the state described referring to FIGS. 9A to 9D. The graph shows a time-series change in measurement value obtained when the finger 10 is in contact with the touch panel 12 and when the finger 10 is not in contact with the touch panel 12 in the structure illustrated in FIG. 3B.

In the graph of FIG. 10A, the horizontal axis represents time, whereas the vertical axis represents signal intensity (digital value obtained by AD conversion of the measurement value of the received signal).

Figure 10B:
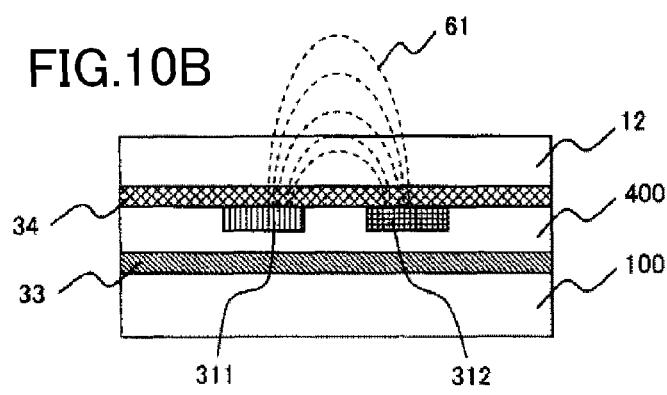
FIGS. 10B to 10D are conceptual diagrams each illustrating a state of the lines of electric force obtained in the time periods respectively denoted by the symbols B to D in FIG. 10A.

A time period between time 0 and time 75 and a time period between time 150 and time 200 are a time period in which the finger 10 is not in contact with the front panel 12 as illustrated in FIG. 10B. The remaining time period (a time period between time 75 and time 150) is a time period in which the finger 10 is in contact with the front panel 12.

Figure 10C:
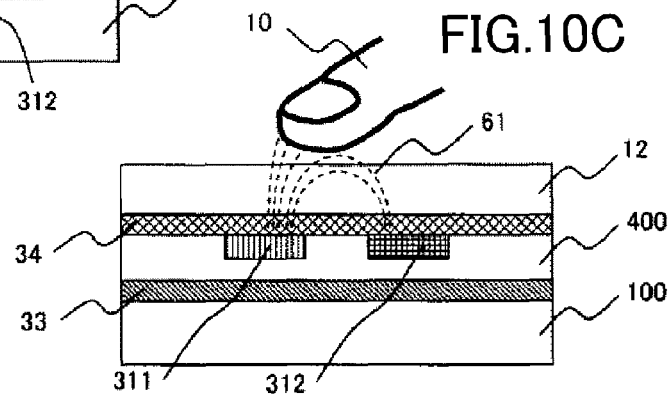
Figure 10D:
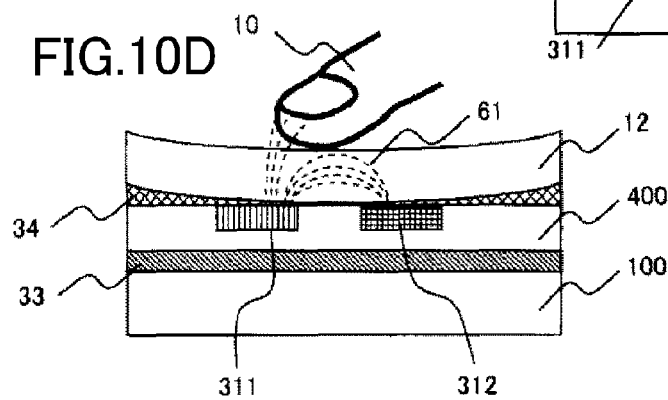

A time period between time 75 and time 110 is a time period in which the finger 10 is in contact with the front panel 12 with a small load thereon, as illustrated in FIG. 10C. A time period between time 110 and time 150 is a time period in which the finger 10 is in contact with the front panel 12 with a large load thereon, as illustrated FIG. 10D.

As described above referring to FIG. 5A, when the finger 10 comes into contact with the front panel 12 with the small load, the structure illustrated in FIG. 3B is not deformed. Therefore, in the time period between time 75 and time 110, the same signal as that generated in the time period between time 75 and time 110 shown in FIG. 7A is generated.

On the other hand, when the finger 10 comes into contact with the front panel 12 with the large load thereon, the front panel 12 is deformed as illustrated in FIG. 5B. As a result, the front panel 12 is deflected toward the touch panel. Then, by the phenomenon illustrated in FIG. 8B, the measurement value 901 is reduced to be finally shifted to the negative side.

In the signal processing for the touch panel 400 of the conventional display device equipped with the touch panel, the generation of the negative measurement value 901 is not taken into consideration. The above-mentioned behavior of the measurement value 901 appears as the disappearance of the measurement value 901. If the above-mentioned phenomenon occurs, the touch panel 400 is placed in a state in which there is no reaction from the touch panel 400 even though the user touches the touch panel 400 with the finger 10.

In this embodiment, however, even when the measurement value is below the threshold value 904 provided on the negative side of the reference value 902, a contact is recognized and then the generation of the effective data is recognized. Further, a function of reversing the polarity of the signal component below the threshold value provided on the negative side of the reference value 902 to obtain a signal 1001 in this state is provided.

As a result, even when the finger 10 is in contact with the front panel 12 with the large load thereon, the disappearance of the measurement value 901 does not occur. Thus, a state, in which no reaction is obtained from the touch panel 400 even though the finger 10 of the user is in contact with the front panel 12, can be avoided.

Figure 11:
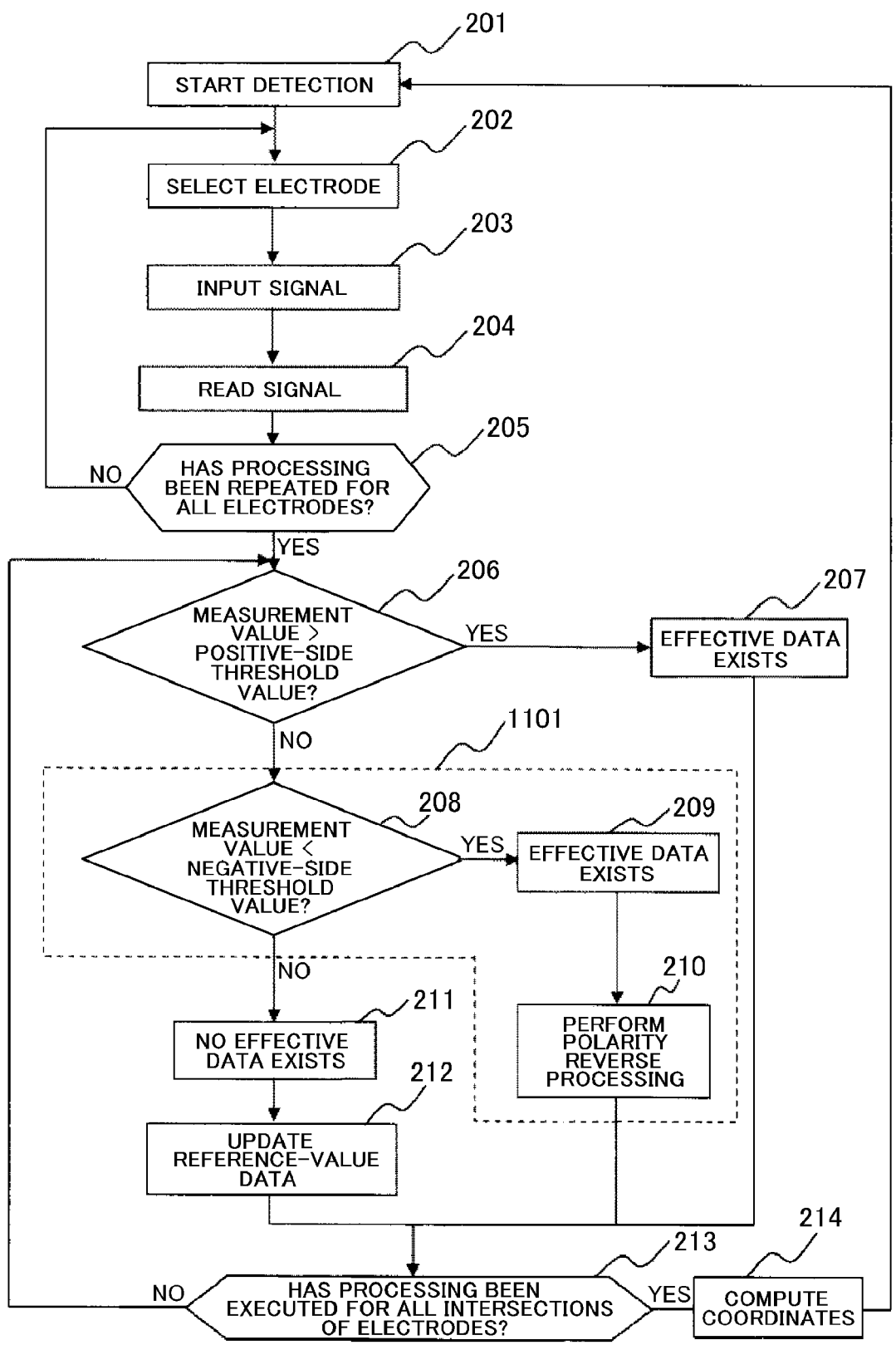
FIG. 11 is a flowchart illustrating a processing procedure of the signal processing of the touch panel of the display device equipped with the touch panel according to the embodiment of the present invention.

FIG. 11 is a flowchart illustrating a processing procedure of the signal processing for the touch panel 400 of the display device equipped with the touch panel according to the embodiment of the present invention. The processing illustrated in FIG. 11 is executed by the control unit 103 illustrated in FIG. 1.

First, when the detection is started in Step 201, one electrodes of the two kinds of electrodes (for example, the X electrodes) is selected (Step 202). Signals (pulses) are input from the selected one electrodes (Step 203). Then, the signals are received by the other one electrodes (for example, the Y electrodes) so that the intensity of each of the signals is measured (Step 204). The measurement value obtained in Step 204 is stored in the storage unit 4 illustrated in FIG. 1 for each of the intersections of the X electrodes and the Y electrodes.

Then, it is determined whether or not the above-mentioned processing has been executed for all the selected type of electrodes (Step S205). When the result of determination is NO in Step 205, the above-mentioned processing starting from Step 201 is executed again. On the other hand, when the result of determination in Yes in Step 205, processing starting from subsequent Step 206 is executed.

In Step 206, it is determined whether or not the measurement value (901 shown in FIG. 10A) is larger than the positive-side threshold value (903 shown in FIG. 10A) for each of the intersections of the electrodes. When the result of determination in Step 206 is YES, it is determined that "effective data exists" (Step 207).

On the other hand, when the result of determination in Step 206 is NO, it is then determined whether or not the measurement value is smaller than the negative-side threshold value (904 shown in FIG. 10A) (Step 208). When the result of determination in Step 208 is YES, it is determined that "effective data exists" (Step 209). Then, polarity reverse processing (processing for obtaining the signal 1001 shown in FIG. 10A) is performed (Step 210).

When the result of determination is NO in Step 208, it is determined "no effective data exists" (Step 211), and then it is determined whether or not the current reference value (902 shown in FIG. 10A) is required to be updated. When it is determined that the reference value is required to be updated, the reference value is updated (Step 212).

Then, it is determined whether or not the above-mentioned processing has been performed for all the intersections of the electrodes (Step 213). When the result of determination is NO in Step 213, the above-mentioned processing starting from Step 206 is executed. When the result of determination is YES in Step 213, the coordinates are computed by using the data determined as effective data in Step 207 and the data determined as effective data in Step 209 to be performed the polarity reverse processing in Step 210 (Step 214). Then, the processing returns to Step 201 to execute a subsequent scan.

In the flowchart of FIG. 11, processing surrounded by a broken line 1101 corresponds to processing additionally provided in this embodiment. By the added processing, even if the measurement value is below the negative-side threshold value, it is determined that "effective data exists". The polarity of the measurement value which is below the negative-side threshold value is reversed so that the measurement value can be treated in the same manner as that for the normal signal.

In general, it is difficult to regulate the operating force of the user (or an operator) to the touch panel 400 because the usability of the equipment would be restricted. Accordingly, it is required to avoid the erroneous operation within the range of the operating force of the user (or an operator) when the user (or operator) unconsciously performs the operation.

In this embodiment, even when the user (or operator) operates the touch panel 400 unconsciously with a strong operating force, the operation can be continued without causing the erroneous operation. As a result, the cost of the equipment equipped with the touch panel can be reduced without impairing the user-friendliness.

Hereinafter, the electrode pattern of the capacitive touch panel according to this embodiment is described.

Figure 12:
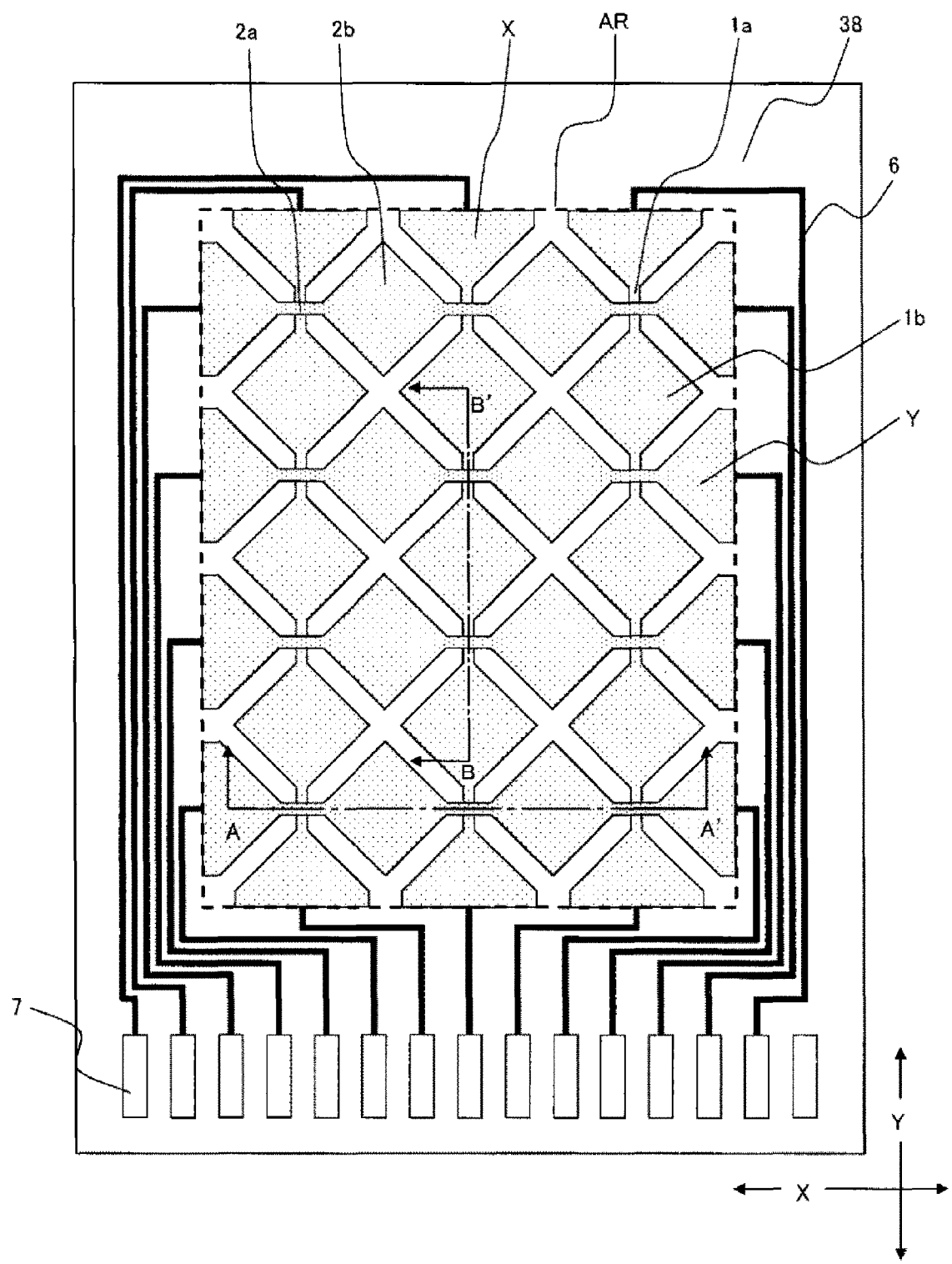
FIG. 12 is a plan view illustrating an electrode pattern of a capacitive touch panel in the display device equipped with the touch panel according the embodiment of the present invention.

FIG. 12 is a plan view illustrating the electrode pattern of the capacitive touch panel according to this embodiment.

FIGS. 13 and 14 are sectional views illustrating a sectional structure of the capacitive touch panel illustrated in FIG. 12. FIG. 13 is a sectional view illustrating a sectional structure taken along the line A-A' of FIG. 12, whereas FIG. 14 is a sectional view illustrating a sectional structure taken along the line B-B' of FIG. 12.

In FIG. 12, wirings 6 and connection terminals 7 are illustrated. An effective touch region AR is a region in which a touch event can be detected when the touch panel 400 is touched with a finger or a conductive pen.

The capacitive touch panel 400 illustrated in FIG. 12 includes the plurality of X electrodes and the plurality of Y electrodes provided on an observer-side surface of a touch-panel substrate 15. Each of the X electrodes extends in a second direction (for example, a Y direction). The plurality of X electrodes are arranged side by side at predetermined arrangement intervals in a first direction (for example, an X direction) crossing the second direction. Each of the Y electrodes extends in the first direction. The plurality of Y electrodes are arranged side by side at predetermined arrangement intervals in the second direction so as to cross the plurality of X electrodes. As the touch-panel substrate 15, a transparent insulating substrate made of, for example, glass or the like is used.

The plurality of X electrodes are each formed in an electrode pattern in which thin-line portions 1a and pad portions 1b are arranged alternately in the second direction. Each of the pad portions 1b has a larger width than that of each of the thin-line portions 1a. The plurality of Y electrodes are each formed in an electrode pattern in which thin-line portions 2a and pad portions 2b are arranged alternately in the first direction. Each of the pad portions 2b has a larger width than that of each of the thin-line portions 2a.

The region in which the plurality of X electrodes and Y electrodes are arranged is the effective touch region AR. Around the effective touch region AR, as illustrated in FIG. 12, the plurality of wirings 6 electrically connected respectively to the plurality of Y electrodes and the plurality of X electrodes are provided.

The plurality of X electrodes are arranged on the observer-side surface of the touch-panel substrate 15. The pad portions 2b of the plurality of Y electrodes are formed on the observer-side surface of the touch-panel substrate 15 so as to be separated away from the X electrodes.

The thin-line portions 2a of the plurality of Y electrodes are provided on an insulating film (PAS1) formed on the observer-side surface of the touch-panel substrate 15. The thin-line portions 2a of the plurality of Y electrodes are covered with a protective film (PAS2) formed thereon.

The thin-line portions 2a of the Y electrodes planarly cross the thin-line portions 1a of the X electrodes. Each of the thin-line portions 2a is connected to the two pad portions 2b, which are adjacent to each other with the thin-line portion 2a therebetween, through a contact hole 12a formed through the insulating film (PAS1) corresponding to an interlayer insulating film between the thin-line portions 2a of the Y electrodes and the thin-line portions 1a of the X electrodes.

As viewed planarly, the pad portion 2b of the Y electrode is arranged between the thin-line portions 1a of the adjacent two X electrodes. The pad portion 1b of the X electrode is arranged between the thin-line portions 2a of the adjacent two Y electrodes.

The plurality of X electrodes and the plurality of Y electrodes are made of a material having a high transmissivity, for example, a transparent conductive material such as indium tin oxide (ITO). Each of the wirings 6 includes a transparent conducive layer made of a transparent conductive material, for example, indium tin oxide (ITO), corresponding to a lower layer, and a metal layer made of, for example, a silver alloy material, corresponding to an upper layer.

Figure 15:
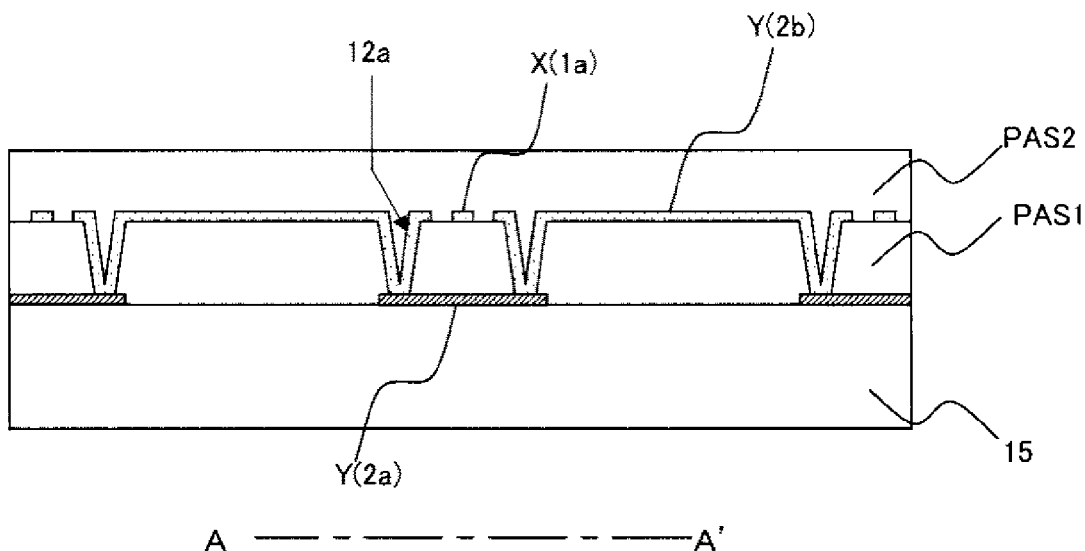
FIG. 15 is a sectional view illustrating another example of the sectional structure of the capacitive touch panel illustrated in FIG. 12, taken along the line A-A' of FIG. 12.
Figure 16:
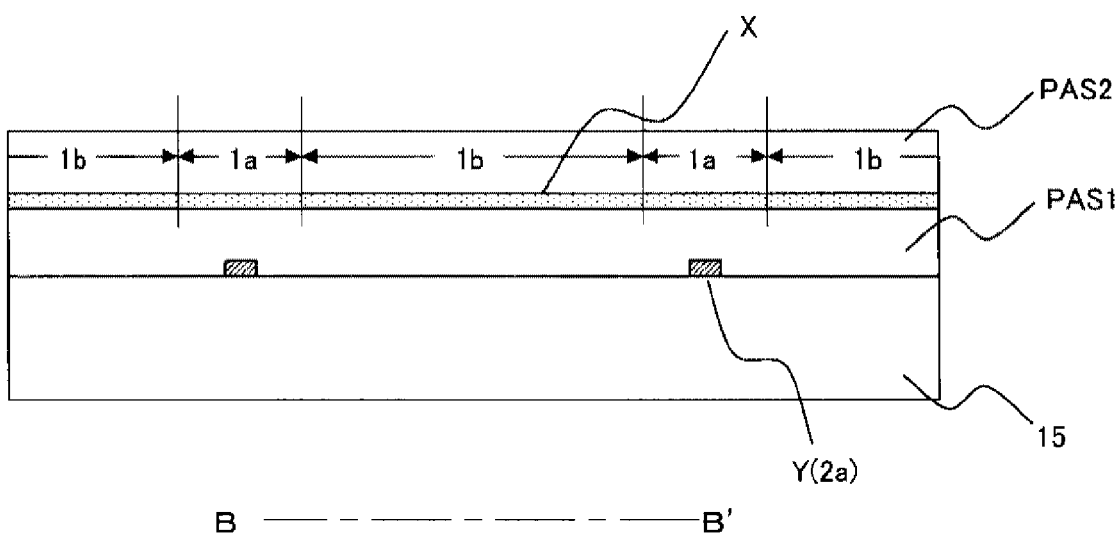
FIG. 16 is a sectional view illustrating the example of the sectional structure of the capacitive touch panel illustrated in FIG. 12, taken along the line B-B' of FIG. 12.

FIGS. 15 and 16 are sectional views illustrating another example of the sectional structure of the capacitive touch panel illustrated in FIG. 12. FIG. 15 is a sectional view illustrating the sectional structure taken along the line A-A' of FIG. 12, and FIG. 16 is a sectional view illustrating the sectional structure taken along the line B-B' of FIG. 12.

In the capacitive touch panel illustrated in FIGS. 15 and 16, the thin-line portions 2a of the plurality of Y electrodes are formed on the observer-side surface of the touch-panel substrate 15. The thin-line portions 1a and the pad portions 1b of the plurality of X electrodes and the pad portions 2b of the plurality of Y electrodes are formed on the insulating film (PAS1). The thin-line portions 1a and the pad portions 1b of the plurality of X electrodes and the pad portions 2b of the plurality of Y electrodes are covered with the protective film (PAS2) formed thereon.

The thin-line portions 2a of the Y electrodes planarly cross the thin-line portions 1a of the X electrodes. Each of the thin-line portions 2a is connected to the two pad portions 2b, which are adjacent to each other with the thin-line portion 2a therebetween, through the contact hole 12a formed through the insulating film (PAS1) corresponding to the interlayer insulating film between the thin-line portions 2a of the Y electrodes and the thin-line portions 1a of the X electrodes.

As viewed planarly, the pad portion 2b of the Y electrode is arranged between the thin-line portions 1a of the adjacent two X electrodes. The pad portion 1b of the X electrode is arranged between the thin-line portions 2a of the adjacent two Y electrodes.

The plurality of X electrodes and the plurality of Y electrodes are made of a material having a high transmissivity, for example, a transparent conductive material such as indium tin oxide (ITO). Each of the wirings 6 includes a transparent conducive layer made of a transparent conductive material, for example, indium tin oxide (ITO), corresponding to a lower layer, and a metal layer made of, for example, a silver alloy material, corresponding to an upper layer.

Figure 17:
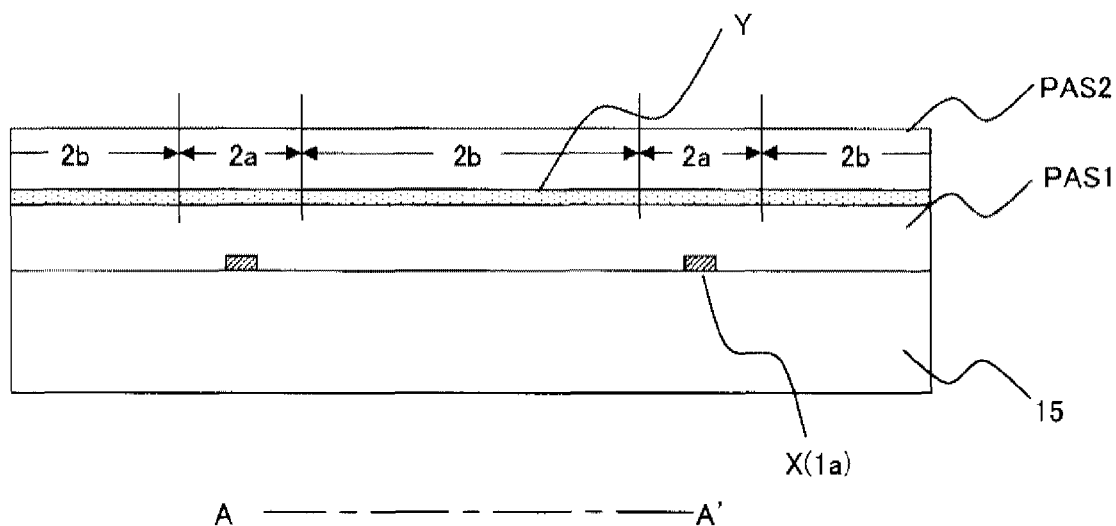
FIG. 17 is a sectional view illustrating a further example of the sectional structure of the capacitive touch panel illustrated in FIG. 12, taken along the line A-A' of FIG. 12.
Figure 18:
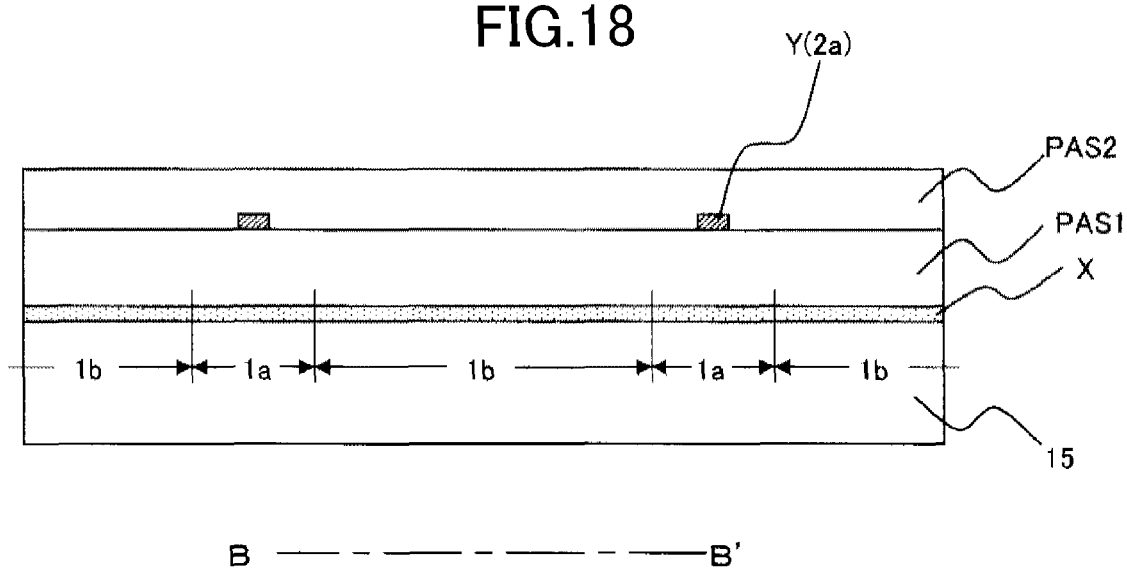
FIG. 18 is a sectional view illustrating the further example of the sectional structure of the capacitive touch panel illustrated in FIG. 12, taken along the line B-B' of FIG. 12.

FIGS. 17 and 18 are sectional views illustrating another example of the sectional structure of the capacitive touch panel illustrated in FIG. 12. FIG. 17 is a sectional view illustrating the sectional structure taken along the line A-A' of FIG. 12, and FIG. 18 is a sectional view illustrating the sectional structure taken along the line B-B' of FIG. 12.

In the capacitive touch panel illustrated in FIGS. 17 and 18, the thin-line portions 1a and the pad portions 1b of the plurality of X electrodes are formed on the observer-side surface of the touch-panel substrate 15. The thin-line portions 2a and the pad portions 2b of the plurality of Y electrodes are formed on the insulating film (PAS1). The thin-line portions 2a and the pad portions 2b of the plurality of Y electrodes are covered with the protective film (PAS2) formed thereon.

In the capacitive touch panel illustrated in FIGS. 17 and 18, the X electrodes and the Y electrodes are formed in different layers. The thin-line portions 2a of the Y electrodes planarly cross the thin-line portions 1a of the X electrodes.

As viewed planarly, the pad portion 2b of the Y electrode is arranged between the thin-line portions 1a of the adjacent two X electrodes. The pad portion 1b of the X electrode is arranged between the thin-line portions 2a of the adjacent two Y electrodes.

The plurality of X electrodes and the plurality of Y electrodes are made of a material having a high transmissivity, for example, a transparent conductive material such as indium tin oxide (ITO). Each of the wirings 6 includes a transparent conducive layer made of a transparent conductive material, for example, indium tin oxide (ITO), corresponding to a lower layer, and a metal layer made of, for example, a silver alloy material, corresponding to an upper layer.

The invention made by the present inventor is described above specifically based on the embodiment, but the present invention is not limited to the embodiment described above, and it is to be understood that various modifications can be made thereto without departing from the gist thereof.

What is claimed is:

1. A touch panel, comprising:
  a capacitive touch panel; and
  a front panel arranged above the capacitive touch panel at a predetermined distance away therefrom to allow for deformation of the front panel toward the capacitive touch panel in response to a touch force exceeding a predetermined amount, wherein:
  the capacitive touch panel includes a plurality of X electrodes and a plurality of Y electrodes,
  the X electrodes being sequentially applied with pulse signals, and the Y electrodes receiving pulse signals;
  when an arbitrary point on the front panel is touched, a same touched point on the capacitive touch panel is computed by using the received signals including both a first signal obtained from the Y electrodes in a case where the front panel is not deformed and a second signal obtained from the Y electrodes in a case where the front panel is deformed; and
  polarities of the first signal and the second signal are opposite to each other relative to a reference value, and
  the first signal shifts toward a first side from the reference value, and
  the second signal shifts towards a second side from the first side across the reference value in succession to the first signal.

2. A touch panel, comprising:
  a capacitive touch panel provided; and
  a front panel arranged above the capacitive touch panel at a predetermined distance therefrom to allow for deformation of the front panel toward the capacitive touch panel in response to a touch force exceeding a predetermined amount,
  wherein the capacitive touch panel includes:
    a plurality of X electrodes; and
    a plurality of Y electrodes;
    a measurement unit for sequentially applying pulse signals to one electrode of the X electrodes and the Y electrodes and receiving the pulse signals from another one electrode of the X electrodes and the Y electrodes so as to measure intensity of each of the received pulse signals; and
    a control unit for detecting an intersection at which the measured intensity of the received pulse signal is larger than a first threshold value and an intersection at which the measured intensity of the received pulse signal is smaller than a second threshold value among intersections of the plurality of X electrodes and the plurality of Y electrodes so as to compute a touched position on the capacitive touch panel, and
  the measured intensity shifts toward a first threshold value from a reference value when a first load is applied on the front panel, and shifts in an opposite direction towards a second threshold value from the first threshold value across the reference value when a second load, which is larger than the first load, is applied to the front panel.

3. The display device equipped with a touch panel according to claim 2, wherein:

the measured intensity of the received pulse signal becomes larger than the first threshold value when the front panel is touched so that the front panel is not deformed;

the measured intensity of the received pulse signal becomes smaller than the second threshold value when the front panel is touched so that the front panel is deformed toward the capacitive touch panel; and the first threshold value is larger than the second threshold value.

4. The display device equipped with a touch panel according to claim 3, wherein:

the first threshold value is set on a side on which the intensity of the received pulse signal increases from a reference value; and the second threshold value is set on a side on which the intensity of the received pulse signal decreases from the reference value.

5. The display device equipped with a touch panel according to claim 4, wherein the reference value is set based on a state in which the capacitive touch panel is not touched.

6. The display device equipped with a touch panel according to claim 4, further comprising a storage unit for storing the measured intensity of the received pulse signal and the reference value for each of the intersections of the X electrodes and the Y electrodes.

7. The display device equipped with a touch panel according to claim 6, wherein the storage unit stores a touch-state management table for managing the touched position.

8. The display device equipped with a touch panel according to claim 2, wherein the control unit reverses polarity of the measured received pulse signal when the measured intensity of the received pulse signal is smaller than the second threshold value.

9. The display device equipped with a touch panel according to claim 1, wherein the front panel is arranged above the capacitive touch panel at the predetermined distance away therefrom by a spacer provided in a peripheral portion of the capacitive touch panel.

10. The display device equipped with a touch panel according to claim 1, wherein the X electrodes and the Y electrodes cross each other via a first insulating layer, each of the X electrodes and the Y electrodes has a pad portion and a thin-line portion that are formed to be alternately arranged in each electrode-extending direction, and the pad portions of the X electrodes and the pad portions of the Y electrodes are arranged without overlapping each other as viewed planarly.

11. The display device equipped with a touch panel according to claim 1, wherein the X electrodes and the Y electrodes cross each other at the intersections via a first insulating layer, each of the X electrodes and the Y electrodes has a pad portion and a thin-line portion that are formed to be alternately arranged in each electrode-extending direction, and the pad portions of the X electrodes and the pad portions of the Y electrodes are arranged without overlapping each other as viewed planarly.

12. The touch panel according to claim 2, wherein the measured intensity shifting toward the first threshold value and the measured intensity value shifting toward to the second threshold value are measured at the same intersection.

\* \* \* \* \*